3,309,266
INSECTICIDAL COMPOSITIONS CONTAINING O-ALKYL-S-ALKYL PHOSPHOROAMIDOTHIOATES AND METHODS FOR KILLING INSECTS THEREWITH
Philip S. Magee, San Rafael, Calif., assignor to Chevron Research Company, a corporation of Delaware
No Drawing. Filed July 1, 1965, Ser. No. 468,930
9 Claims. (Cl. 167—22)

This invention is directed to a novel, unique group of insecticidal compositions and their use in killing insects. More particularly, it relates to insecticidal compositions containing O-akyl-S-alkyl phosphoroamidothioates and their remarkable effectiveness in killing insects systemically.

Various amino-substituted phosphorus compounds, particularly thionophosphoroamidates, have been reported as having use as insecticides. Among these phosphorus compounds, a few are disclosed as being useful for controlling insects by systemic means. Specifically, alkylamido alkanedithiophosphates and the amides of dialkoxythiophosphoric acids are known compounds which have been disclosed as being systemically active in controlling insects.

It has now been found that a particular group of phosphoramidothioates display remarkable effectiveness in killing insects systemically as well as by contact means. These phosphoroamidothioates which find use as the active ingredients of the compositions of this invention have the structural formula:

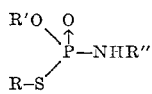

wherein R and R' are alkyl of from 1 to 6 carbons and R'' is selected from the group consisting of hydrogen and alkyl of from 1 to 4 carbons. Preferably, R'' is hydrogen, and even more preferably, R and R' are methyl and R'' is hydrogen.

The insecticidal activity, and especially the systemic activity of these O-alkyl-S-alkyl phosphoroamidothioates, far exceeds that of the previously used related compounds. Moreover, whereas the most closely related of the previously used compounds show no or only little activity in direct application to insects, the compounds used in this invention exhibit significant control of insects when applied directly. Even more importantly, the surprising systemic effectiveness of these compounds is at least equal to that of the present comerically used systemic insecticides.

Illustrative of the phosphoroamidothioates which may find use in this invention are: O-methyl-S-methyl phosphoroamidothioate, O-methyl-S-ethyl phosphoroamidothioate, O-ethyl-S-methyl phosphoroamidothioate, O-ethyl-S-ethyl phosphoroamidothioate, O-ethyl-S-propyl phosphoroamidothioate, O-methyl-S-methyl methylphosphoroamidothioate, O - ethyl - S - propyl ethylphosphoroamidothioate, O-butyl-S-methyl propylphosphoroamidothioate, O-hexyl-S-amyl butylphosphoroamidothioate, O-butyl-S-hexyl methylphosphoroamidothioate, etc.

The phosphoroamidothioates of the compositions and methods of this invention may be prepared by reacting an O,O-dialkyl chlorophosphorothioate with ammonia or a primary alkylamine and then heating the reaction product in the presence of a suitable alkylating agent. Alkylating agents such as alkyl halides, particularly iodides, e.g., methyl iodide, ethyl iodide, butyl iodide, etc., and dialkyl sulfates, e.g., dimethylsulfate, diethylsulfate, diamylsulfate, etc., may be used. In some instances only small amounts of alkylating agent may be employed. However, usually amounts exceeding stoichiometric proportions will be used.

In the reaction between the chlorophosphorothioate and ammonia or alkylamine, it is preferable to use an inert diluent such as an aromatic or paraffinic solvent. The ammonia and gaseous alkylamines may be passed as such through the phosphorothioate solution. The liquid primary alkylamines may be added directly to the solution. The inert diluent will normally be removed prior to addition of the alkylating agent. Removal of the diluent is conveniently accomplished by stripping.

Heating of the stripped reaction product will usually take place at temperatures between about 20–80° C. For convenience reflux temperatures may be used in this step. The alkylating agent may be removed from the final product by known methods such as distillation. Further workup and purification of the product may be achieved by dissolving it in an inert solvent, removing insoluble by-products and stripping the solvent under vacuum.

The following example is presented for the purpose of illustrating the preparation of O-alkyl-S-alkyl phosphoroamidothioates which are employed in the methods and compositions of this invention. This example is given by way of illustration and is in nowise limiting of the invention described herein.

*Example 1*

A 130 gram portion of O,O-dimethylchlorophosphorothioate dissolved in 600 milliliters benzene was charged to a flask and cooled in an ice bath. Through this solution were passed 36 grams gaseous ammonia. The temperature was held at 10–15° C. The solids were allowed to settle; the solution was filtered and the salt cake was washed with benzene. The solution was then stripped to 60° C. at 20 millimeters Hg. The stripped product was combined with a 100 milliliter portion of methyl iodide and refluxed for 6 hours. The mixture was then stripped again to 60° C. at 20 millimeters Hg and the residual oil was dissolved in 570 mililiters of a 80% dichloromethane-20% hexane solvent with stirring, the solution was filtered and the solids were removed. The solvent was stripped from the filtrate to 60° C. at 20 millimeters Hg leaving 98 grams of O-methyl-S-methyl phosphoroamidothioate. This compound was observed as a pale yellow liquid of moderate viscosity which crystallizes on standing, melting completely at 32° C.

*Analysis.*—Calculated: percent P. 21.95; percent S, 22.70; percent N, 9.93. Found: percent P, 21.10; percent S, 22.61; percent N, 9.50.

The phosphoramidothioate described above and similarly prepared phosphoroamidothioates were tested for effectiveness as systemic insecticides, both as a soil drench and as applied to the plant systems. For comparative purposes, several related compounds, some of which are disclosed as having systemic insecticidal activity, and the commercial insecticide, Systox,[1] were tested under identical conditions.

The soil drench method is termed "Method A" in Table I; it is carried out as follows: The two-spotted mite (*Tetranychus telarius* L.) is the insect used with Fordhook lima beans as the host. A solution of the toxicant is prepared in acetone containing 12 drops of a liquid premixed emulsifier. The desired concentration of toxicant is diluted 10-fold with water and 40 milliliters of ---
[1] Registered trademark of Farbenfabriken Bayer A.G. for O,O-diethyl-O-2-ethylthioethylthionophosphate.

the aqueous solution are poured around the plants. The plants are infested with mites by placing 10 to 14-day-old plants in the mitehouse and infested leaves from the stock colony are placed over the plants. After 48 hours, the plants are inspected for mortality. The data in Table I report the percent control at the indicated toxicant concentrations.

The method termed "Method B" in Table I uses the same organism as used in Method A with Fordhook lima beans. Approximately 3 drops of the toxicant solution at the desired concentration is applied to the stem below the cotyledons with a pipet. After 48 hours, the plants are infested with mites by placing infested leaves on the plants in a warm environment. Mortality is rated after 48 hours. The results of this testing are also reported on Table I.

TABLE I

| Compound | Method A | | Method B | |
|---|---|---|---|---|
| | P.p.m. | Percent control | P.p.m. | Percent control |
| $CH_3O$ $\searrow$ $O$ $\uparrow$ $P-NH_2$ / $CH_3S$ | 100 | 100 | 5,000 | 100 |
| | 30 | 100 | 2,500 | 100 |
| | 10 | 98 | 1,250 | 90 |
| $C_2H_5O$ $\searrow$ $O$ $\uparrow$ $P-NH_2$ / $CH_3S$ | 10 | 95 | 1,250 | 95 |
| $C_2H_5O$ $\searrow$ $O$ $\uparrow$ $P-NH_2$ / $C_2H_5S$ | | | 1,250 | 78 |
| $C_2H_5O$ $\searrow$ $O$ $\uparrow$ $P-NH_2$ / $C_3H_5S$ | 10 | 88 | | |
| $C_2H_5O$ $\searrow$ $O$ $\uparrow$ $P-N$ $\searrow$ $H$ / $C_2H_5S$ $\searrow$ $CH_3$ | 20 | 97 | | |
| | 10 | 82 | | |
| $C_2H_5O$ $\searrow$ $O$ $\uparrow$ $P-N$ $\searrow$ $H$ / $C_2H_5S$ $\searrow$ $C_2H_5$ | 25 | 82 | | |
| $CH_3O$ $\searrow$ $O$ $\uparrow$ $P-N$ $\searrow$ $H$ / $CH_3S$ $\searrow$ $C_2H_5$ | 25 | 99 | | |
| $CH_3O$ $\searrow$ $O$ $\uparrow$ $P-NH_2$ / $CH_3O$ | 100 | 0 | 5,000 | 0 |
| | 30 | 0 | 2,500 | 0 |
| | 10 | 0 | 1,250 | 0 |
| $C_2H_5O$ $\searrow$ $S$ $\uparrow$ $P-NH_2$ / $C_2H_5O$ | 100 | 18 | 5,000 | 0 |
| | 30 | 0 | 2,500 | 0 |
| | 10 | 0 | 1,250 | 0 |
| $CH_3O$ $\searrow$ $O$ $\uparrow$ $P-NH_2$ / $CH_3O$ | 100 | 6.5 | 5,000 | 0 |
| | 30 | 0 | 2,500 | 0 |
| | 10 | 0 | 1,250 | 0 |
| Systox | 100 | 98 | 5,000 | 100 |
| | 30 | 76.5 | 2,500 | 92 |
| | 10 | 60 | 1,250 | 73 |

Further systemic testing according to the drench method (Method A) previously described was conducted with other plants and insects using O-methyl-S-methyl phosphoroamidothioate. For comparative purposes, the commercial insecticide, Systox, was tested under identical conditions. The results of these tests are reported in Table II.

TABLE II

| Plant/Pest | Concentration, p.p.m. | Percent Control | |
|---|---|---|---|
| | | $CH_3O$ $\searrow$ $O$ $\uparrow$ $P-NH_2$ / $CH_3S$ | Systox |
| Lima bean/Phosphate-resistant 2-spot mites.[1] | 40 | 99.3 | 88 |
| | 20 | 33 | 4.5 |
| | 10 | 4.5 | 0 |
| Cucumbers/Aphids [2] | 10 | 100 | 98 |
| | 5 | 92 | 69 |
| | 2.5 | 74 | 61 |

[1] Fordhook beans; *Tetranychus telarius* L. Based on mortality after 5 days.
[2] National Pickling; *Aphis gossypii* Glover.

Additionally, the preferred phosphoroamidothioates of the present invention were evaluated as contact insecticides against aphids and flies. As before, the most closely related compounds were tested under identical conditions for comparative purposes.

The method used to obtain the data concerning the aphids employs *Aphis gossypii* Glover as the test organism with cucumbers (variation National Pickling) as the host. In this method disks are cut from a primary leaf with a No. 15 cork borer. The disk is put in the bottom of a 100 milliliter beaker and a gas funnel is placed over the leaf disk. Approximately 50–100 of the organisms are blown into the funnel and onto the leaf disk. The infested leaf disk is placed into a Petri dish having 2 circles of paper towel or filter paper covering the bottom and wet with 16 drops of water. The organisms are allowed to settle for about 2 hours.

A 1% acetone solution of the active ingredient is diluted with water to the desired concentration. The disk is sprayed with the solution of the active ingredient, allowed to dry and observed for mortality in 24, 28 and 72 hours. The percent control is determined as compared to a standard.

The method used to obtain the data on flies employs the housefly, *Musca domestica* L. A 1% acetone solution of the toxicant is diluted further with acetone to the desired concentration and placed in a 1 ml. syringe set to displace 0.5λ doses. A random mixture of male and female houseflies are anesthetized with $CO_2$ and 3 replicates of 20 flies each are sorted out and placed on squares of corrugated cardboard. To each of these flies are applied directly two 0.5λ doses of the acetone solution from the syringe. Each replicate is then placed in a covered ½ pint recovery cage along with a piece of water-soaked cotton wick. The cages are placed in a recovery chamber at 75° F. and observed for mortality after 24 hours. Control is reported as the percentages of the flies dead after this period. The results of this contact insecticidal testing are reported in Table III.

TABLE III

| Compound | Aphids | | Flies | |
|---|---|---|---|---|
| | P.p.m. | Percent control | P.p.m. | Percent control |
| $CH_3O$ $\searrow$ $O$ $\uparrow$ $P-NH_2$ / $CH_3S$ | 30 | 96 | 62.5 | 100 |
| | 10 | 50 | 15 | 87 |
| $C_2H_5O$ $\searrow$ $O$ $\uparrow$ $P-NH_2$ / $CH_3S$ | 30 | 97 | 62 | 100 |
| | 10 | 88 | 15 | 100 |
| $C_2H_5O$ $\searrow$ $O$ $\uparrow$ $P-NH_2$ / $C_2H_5S$ | 30 | 84 | 62 | 100 |
| | 10 | 48 | 15 | 97 |

TABLE III—Continued

| Compound | Aphids | | Flies | |
|---|---|---|---|---|
| | P.p.m. | Percent control | P.p.m. | Percent control |
| $\begin{array}{c}C_2H_5O\phantom{xx}O\\ \diagdown\uparrow\\ \phantom{xx}P-NH_2\\ \diagup\\ C_3H_5S\end{array}$ | 30 | 22 | | |
| | 10 | 10 | | |
| $\begin{array}{c}CH_3O\phantom{xx}O\\ \diagdown\uparrow\\ \phantom{xx}P-NH_2\\ \diagup\\ CH_3O\end{array}$ | 30 | 0 | 15 | 12 |
| | 10 | 0 | | |
| $\begin{array}{c}C_2H_5O\phantom{xx}O\\ \diagdown\uparrow\\ \phantom{xx}P-NH_2\\ \diagup\\ C_2H_5O\end{array}$ | 30 | 0 | 15 | 10 |
| | 10 | 0 | | |
| $\begin{array}{c}CH_3O\phantom{xx}O\\ \diagdown\uparrow\\ \phantom{xx}P-NH_2\\ \diagup\\ CH_3O\end{array}$ | 30 | 0 | 15 | 5 |
| | 10 | 0 | | |

Aside from the specific formulations and applications of the class of phosphoroamidothioates of this invention as represented by the foregoing tests, these compounds may dispersed in or upon other inert liquid and solid carriers. The solid carriers, such as clay, may be in the form of dusts, granules or wettable powders. A preferred solid formulation is from about 2–10 weight percent toxicant on clay granules.

In general, the phosphoroamidothioates of the methods and compositions of this invention are water miscible. Depending on the size of the alkyl groups bonded to the oxygen and sulfur of these compounds, they may also be oil soluble. Therefore, the solvent used will depend upon the solubility characteristics of the particular compounds being formulated. For instance, those having alkyl groups such as hexyl, amyl and butyl would be somewhat soluble in the common saturated hydrocarbon and aromatic solvents. Therefore, such solvents would be suitable for use in liquid formulations with these higher alkyl compounds. On the other hand, some of the lower alkyl compounds, particularly where the alkyl groups bonded to the sulfur and oxygen are both methyl, are quite insoluble in saturated hydrocarbons. In formulating these type of compounds it is necessary to employ polar, water-miscible solvents. For instance the O-methyl-S-methyl compounds are considerably soluble in chloroform, methylene chloride, common oxygenated solvents, methylethylketone, N-methyl pyrollidone, etc.

Preferred liquid formulations of the O-alkyl-S-alkyl phosphoroamidothioates of this invention comprise from about 10–80 weight percent phosphoroamidothioate in a suitable liquid solvent.

Further, these compounds may not only be applied alone or in mixtures of other compounds of the disclosed class but may also be used in combination with other active toxicants in the formulation of agriculturally useful compositions for control of plant infesting pests.

The compounds with or without a suitable carrier or diluent may be applied in toxic amounts to any environmental area or habitat which is a host to insect pests or susceptible to insect attack. For example, compositions may be sprayed or otherwise applied directly to a plant or other host, may be applied to the plant seed, sprayed upon the soil or other immediate plant environment or used in similar ways so as to effect the control of insects.

As will be evident to those skilled in the art, various modifications of the methods and compositions of this invention may be made or followed, in the light of the foregoing disclosure and discussion, without departing from the spirit or scope of the disclosure or from the scope of the following claims.

I claim:
1. A method for killing insects which comprises applying to the immediate environment of a host plant subject to attack by said insects a toxic amount of a compound of the formula:

$$\begin{array}{c}R'O\phantom{xx}O\\ \diagdown\uparrow\\ \phantom{xx}P-NHR''\\ \diagup\\ R-S\end{array}$$

wherein R and R' are alkyl of from 1 to 6 carbons and R'' is selected from the group consisting of hydrogen and alkyl of from 1 to 4 carbons.

2. The method of claim 1 wherein R'' is hydrogen.
3. The method of claim 2 wherein R and R' are methyl.
4. A method for killing insects which comprises contacting said insects with a toxic amount of a compound of the formula:

$$\begin{array}{c}R'O\phantom{xx}O\\ \diagdown\uparrow\\ \phantom{xx}P-NHR''\\ \diagup\\ R-S\end{array}$$

wherein R and R' are alkyl of from 1 to 6 carbons and R'' is selected from the group consisting of hydrogen and alkyl of from 1 to 4 carbons.

5. The method of claim 4 wherein R'' is hydrogen.
6. The method of claim 5 wherein R and R' are methyl.
7. An insecticidal composition comprising a toxic amount of a compound of the formula:

$$\begin{array}{c}R'O\phantom{xx}O\\ \diagdown\uparrow\\ \phantom{xx}P-NHR''\\ \diagup\\ R-S\end{array}$$

wherein R and R' are alkyl of from 1 to 6 carbons and R'' is selected from the group consisting of hydrogen and alkyl of from 1 to 4 carbons and an inert carrier therefor.

8. The composition of claim 7 wherein R'' is hydrogen.
9. The composition of claim 8 wherein R and R' are methyl.

References Cited by the Examiner

UNITED STATES PATENTS

| | | | |
|---|---|---|---|
| 2,957,020 | 10/1960 | Perkow | 260—959 |
| 3,010,986 | 11/1961 | Reetz | 260—959 |
| 3,062,705 | 11/1962 | Youngson | 260—959 |
| 3,072,702 | 1/1963 | Senkbeil | 260—959 |
| 3,099,675 | 7/1963 | Senkbeil | 260—959 |

FOREIGN PATENTS

| | | |
|---|---|---|
| 1,077,215 | 3/1960 | Germany. |
| 1,080,109 | 4/1960 | Germany. |

OTHER REFERENCES

Klee: J. Pharm. Sci. 51 (1962), p. 423.
Zen'kovich: Chem. Abst. 54 (1959), p. 7051F.

ALBERT T. MEYERS, Primary Examiner.

JULIAN S. LEVITT, SAM ROSEN, Examiners.

STANLEY J. FRIEDMAN, Assistant Examiner.